United States Patent [19]

Bahner et al.

[11] 4,339,949

[45] Jul. 20, 1982

[54] PROCESS AND APPARATUS FOR THE THERMAL MEASUREMENT OF MASS FLOW

[75] Inventors: Friedrich Bahner, Rotenburg; Harry Pleva, Horb, both of Fed. Rep. of Germany

[73] Assignee: Babcock-BSH AG, Krefeld, Fed. Rep. of Germany

[21] Appl. No.: 107,653

[22] Filed: Dec. 27, 1979

[30] Foreign Application Priority Data

Dec. 27, 1978 [DE] Fed. Rep. of Germany ....... 2856289

[51] Int. Cl.³ .............................................. G01F 1/68
[52] U.S. Cl. .................................................... 73/204
[58] Field of Search ................ 73/15 R, 15 A, 190 H, 73/204

[56] References Cited

U.S. PATENT DOCUMENTS

| | | | |
|---|---|---|---|
| 1,528,383 | 3/1925 | Schmidt | 73/190 |
| 1,691,600 | 11/1928 | Brush, Jr. et al. | 73/204 |
| 2,193,762 | 3/1940 | Hirch et al. | 73/190 |
| 2,728,225 | 12/1955 | Skibitzke | 73/204 |
| 2,994,222 | 8/1961 | Laub | 73/204 |
| 3,238,775 | 3/1966 | Watts | 73/190 |
| 3,336,804 | 8/1967 | Poppendiek et al. | 73/204 |

FOREIGN PATENT DOCUMENTS 201694 11/1967 U.S.S.R. .............................. 73/204

OTHER PUBLICATIONS

Kessie, "The Design and Construction of Thermal Flowmeters", in Argonne National Laboratory Report ANL-6531, 3/62, pp. 1-3.

Primary Examiner—Herbert Goldstein
Attorney, Agent, or Firm—Michael J. Striker

[57] ABSTRACT

A thermal measurement of mass flow is obtained by passing a flowing mass through a hollow passageway, measuring the temperature of the mass at the inlet and at the outlet of said passageway and additionally measuring the heat flow released or absorbed through the walls of the passageway and then determining the mass flow by setting up the heat balance equation on the basis of the obtained data. Preferably, the data are fed into a computer to solve the resulting heat balance equation. The invention also comprises an apparatus wherein temperature sensors are arranged at both ends of a tubular passageway and wherein the heat flow meter comprises concentric wire coils of a thermic resistance material wound around the outer periphery of the tube and an interposed layer of predetermined thickness formed of a material of at most moderate heat conductivity.

6 Claims, 5 Drawing Figures

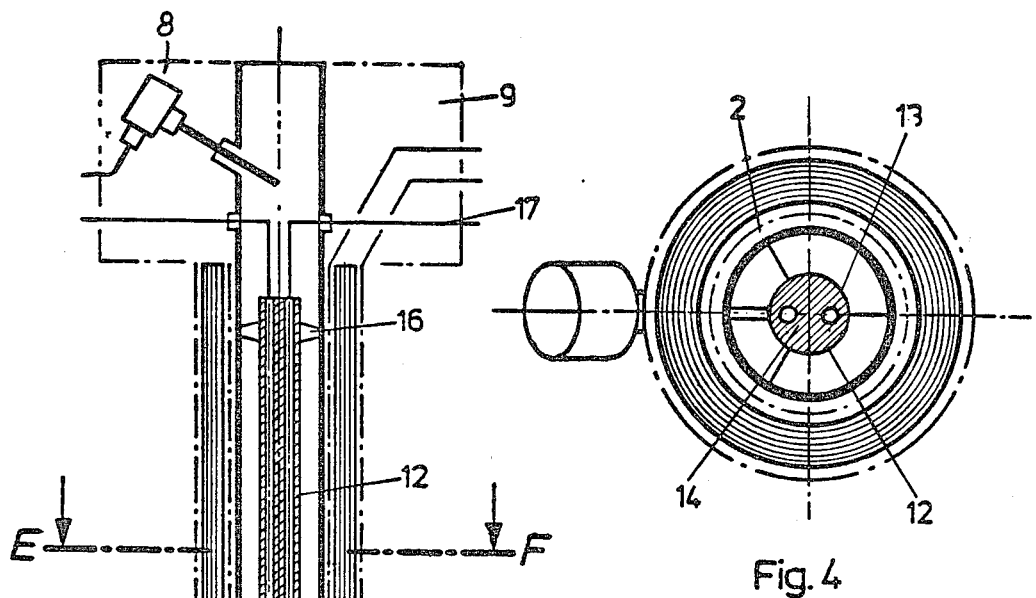
Fig. 3
Fig. 4
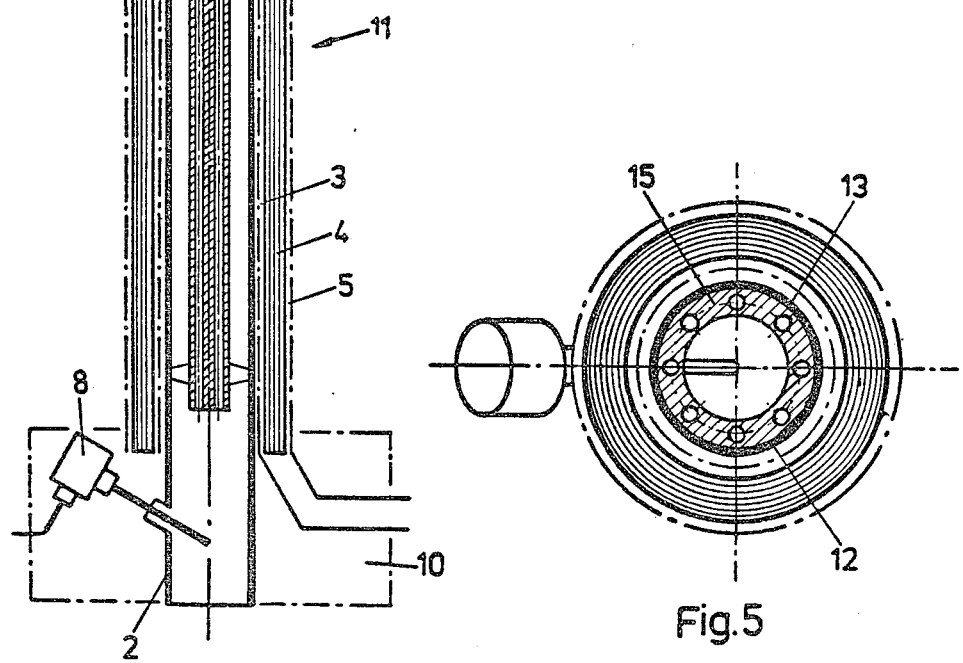
Fig. 5

4,339,949

PROCESS AND APPARATUS FOR THE THERMAL MEASUREMENT OF MASS FLOW

BACKGROUND OF THE INVENTION

The invention relates to a process and apparatus for the thermal measurement of mass flow.

In prior art processes the mass flow is passed through a hollow body and its inlet and outlet temperature are measured. In a particular process of this type a flowing fluid is heated by a predetermined amount of heating power and the temperature rise of the fluid is then measured (Laub, J. H. "Read massflow directly with thermal flowmeters", Cont. Eng., April 1966, S. 69-72).

An apparatus operating by this principle is the so-called "Thomas-meter". It comprises a tube with an interior heating coil which includes resistance thermometers ahead of and behind the heating coil. The heating power is kept at a constant level and the temperature difference appearing at the resistance thermometers is then determined.

This prior art apparatus, however, requires that the heat supplied is fully transmitted to the fluid. This is possible only in case of materials with a high heat transfer number. The Thomas-meter and similar apparatus are therefore adapted mainly for measurements of fluids, while in case of media with a low heat transfer number they do not give correct results because of the unrecorded heat losses such as radiation loss and heat loss occurring through the tube wall.

There is also known a coloric meter for steam or heat amounts (West German Pat. No. 590,825) wherein the flowing medium must release all of its heat contents to a cooling agent and wherein the heat flow passing through the wall of the heat exchanger is determined by means of a multiplicity of in series arranged thermocouples. This prior art apparatus, however, is rather complex and costly.

It is therefore an object of the invention to provide for a process and simplified apparatus of the general type indicated which permits the exact measurement also in case of media which have a low heat transfer number.

SUMMARY OF THE INVENTION

This is accomplished by additionally measuring the heat flow released through the tube body of the surrounding area and determining the mass flow from the obtained data by means of the heat balance equation. It will be understood that this is in addition to measuring the temperature of the medium prior and subsequent to entering the tube through which it passes.

The data obtained preferably are passed into an electronic computer in order to obtain the solution of the resulting heat balance equation.

Preferably, the apparatus according to the invention comprises temperaure sensors at its terminal ends, an internally heated tube and two concentric electrically insulated coils provided at the outer periphery of the tube which consist of a thermal resistance wire and which are separated by a layer of a material of at most moderate thermal conductivity of predetermined thickness.

To obtain a sufficient temperature difference between the medium to be measured and the environment, it is possible for instance to heat the tube either internally or externally or to surround it by a cooling device.

The heat transfer can also be improved by providing in the interior of the tube an enlargement of the interior surfaces, for instance by use of a spiral spring.

The apparatus of the invention can be used also to determine the specific heat of a flowing medium by first determining the mass flow and then using this in the heat balance equation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a further embodiment of the mass flow meter according to the invention with a built-in electrical heater, this Figure being a vertical section;

FIG. 4 is a horizontal cross section along lines E—F of FIG. 3 on an enlarged scale; and FIG. 5 is a variant of the heater structure used in the last embodiment, the Figure showing a vertical section.

PREFERRED EMBODIMENTS OF THE INVENTION

Figures 1, 2:
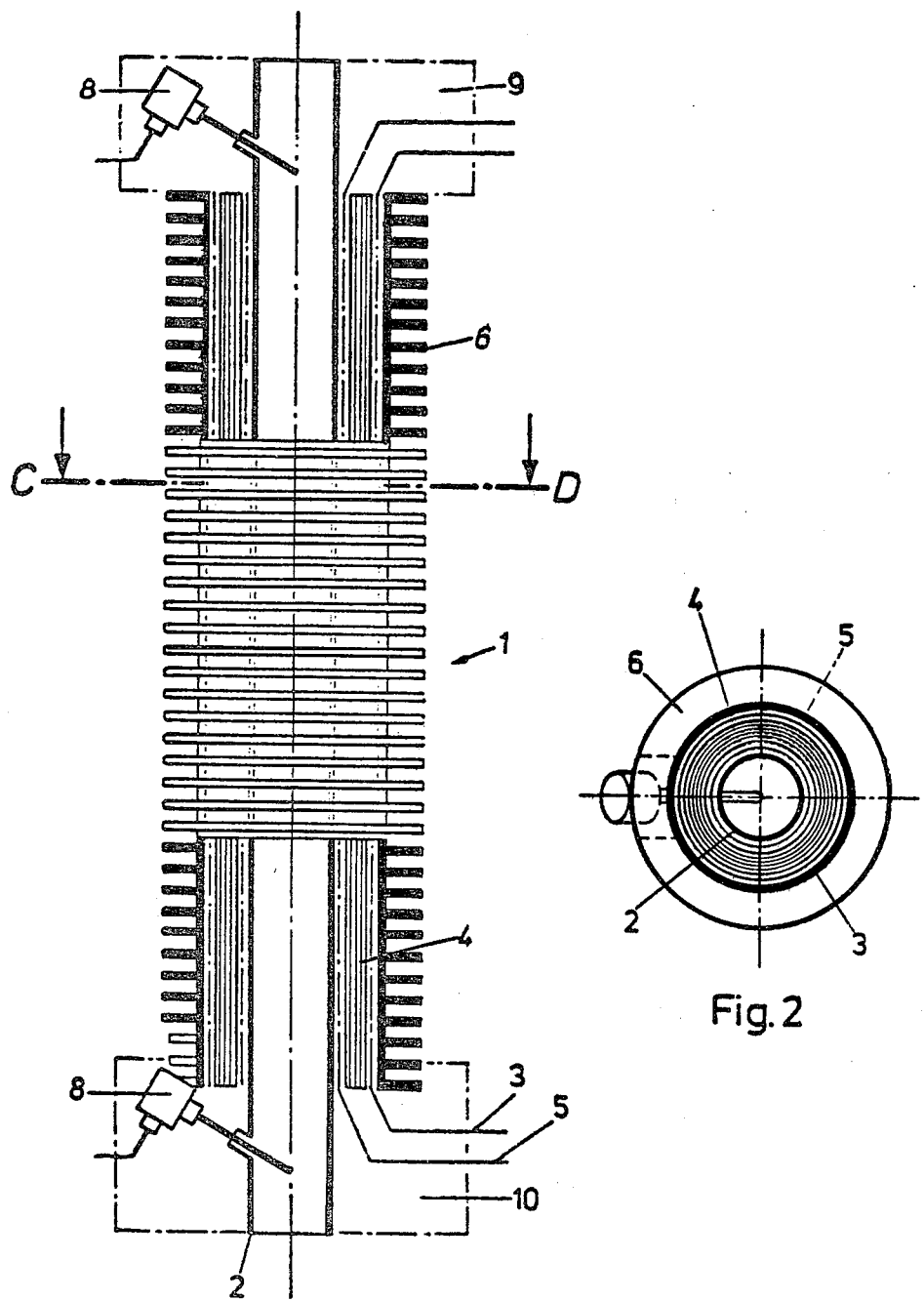
FIG. 1 shows, partly in section, a mass flow meter with an integrated heat flow meter according to the invention.
FIG. 2 is a horizontal cross section along the lines C—D of FIG. 1 on an enlarged scale.

In the following description of the embodiments a nomenclature will be used as follows:
N = heating power
k = proportionality factor
ṁ = mass flow
c = specific heat
$\theta_1$ = inlet temperature
$\theta_2$ = outlet temperature
$\Delta\theta$ = temperature difference In the embodiment of FIG. 1, the mass flow meter 1 for instance consists of a thin walled special steel tube 2 of a length of 200 mm and an interior diameter of 13 mm. A first coil 3 of insulated copper wire is provided on the tube 2. The wire has a thickness of 0.1 mm and is wound in about 1,000 windings. The base resistance of this coil related to 0° C. amounts to about 100 Ω. This coil 3 is surrounded by a layer 4 which may for instance be a plastic or ceramic and in any case consists of a material having only a moderate heat conductivity at most. The layer 4 has a definite thickness of for instance about 2 mm.

A second wire coil is provided of the same material as coil 3 and is also wound upon the tube. This coil 5 forms the inner coil and may for instance be fixed in position by a lacquer.

Reference numeral 6 refers to a cooling coat provided with ribs for which, however, may also be substituted a heating device. Whether a cooling coat or a heating device is used depends on the temperature of the gas that flows through the inside passage of the tube and on the desired direction of the temperature differential, that is whether from the interior of the tube towards the outside or reverse.

At the inlet and outlet of the tube 2 there are provided electric temperature sensors 7 and 8, for instance resistance thermometers which extend into the interior of the tube and thus into the gas flow. The terminal areas of the tube 2 which are outside the cooling device 6 are enclosed by a heat blocking insulating sheath 9, 10. The outer ends of the coils 3, 5 and the outer ends of the thermometer sensors 7, 8 are connected with an electronic computer (not shown) for the purpose of obtaining the solution of the heat equation balance.

This type of computer has become known for instance from the West German Pat. No. 22 35 853 and needs only to be adapted to the particular problem involved. To improve the heat transfer in the interior of the tube 2 there may be used elements which increase the interior heat exchange surface of the tube such as a spiral spring.

A further embodiment is shown in FIGS. 3 to 5. In this embodiment the mass flow meter 11 is intended for measurements in which the gas to be measured does not have an adequate temperature difference from the interior to the outside of the tube 2 of where a condensation of the gas may occur. The same parts in the different Figures are indicated by the same reference numbers.

As appears, within the tube 2 there is provided an electrically operated heating device 12. This heating device for instance consists of a heating tube or heating wire 13 which is disposed within a solid support 14 (FIG. 4) or inside of a support tube 15 (see FIG. 5) but may also be provided on the outer surface of the support or support tube or may be wound thereon. The heater 12 is for instance secured by holders 16 in the interior of the tube 7 and is supplied with heating power through the connections 17. The heater 12 releases a constant heating power N. The generated heat is released partly by convection to the flowing gas and partly by radiation or heat conduction directly into the wall of the tube.

The embodiment of FIG. 3 is well adapted to provide a calibration of the heat flow meter which consists of the elements 3 to 5. The heat variation in this case results from the tension around by the heater 12 and the amount of introduced heating flow. In case of variation of this heat power the heat flow through the tube 2, the coil 3 the layer 4 and the coil 5 will correspondingly vary. This results in a change of the temperature sensitive resistance of the coils 3 and 4 corresponding to the temperature difference $\Delta\theta$ arising at the two sides of the layer 4. This change of the resistance can for instance be measured through resistance bridges. This results in the linear equation $N = k \cdot \Delta\theta$ in which k is a specific constant of the structure of the measuring device. For instance, with the data indicated in the description of FIG. 1 a temperature difference $\Delta\theta$ between the coils 3 and 5 appeared of 0.4 K/Watt.

The operation of the mass flow meter of the invention is based on the determination of the temperature data necessary for the solution of the specific heat balance equation. In case of the embodiment of the mass flow meter according to FIG. 1 the heat differential between the temperature sensors 7 and 8 corresponds to the heat flow through the wall of the tube 2. With reference to the above given nomenclature the heat balance equation would be as follows:

$$k \cdot \Delta\theta = \dot{m} \cdot c \cdot (\theta_1 - \theta_2)$$

From this results the size of the mass flow as follows:

$$\dot{m} = \frac{k \cdot \Delta\theta}{c(\theta_1 - \theta_2)}$$

The quantities $\theta_1$ and $\theta_2$ are determined by means of the temperature sensors 7 and 8 and $\Delta\theta$ is found by means of the coils 3 and 5.

In case of the embodiment of the mass flow meter according to FIG. 3 the heating power N which is produced by the heater 12 is transferred partly through convection to the flowing gas and partly through radiation or heat conduction directly to the wall of the tube. In this case the heat balance equation would read:

$$N = \dot{m} \cdot c \cdot (\theta_1 - \theta_2) + k \cdot \Delta\theta$$

From this is obtained the equation for the mass flow as follows:

$$\dot{m} = \frac{N - k \cdot \Delta\theta}{c(\theta_1 - \theta_2)}$$

The individual quantities are found as in the embodiment according to FIG. 1.

The specific heat c of the measured gas must in all cases be constant or the composition of the gas and the temperature relation of c must be known. Besides, there must not be any condensation.

However, if the mass flow is known it is possible to measure also the specific heat of the flowing medium with the apparatus of the invention.

The heat transfer conditions do not affect the results with the mass flow meters of the invention. The apparatus is therefore particularly suited for the measurement of small amounts of gas down to about 1 kg/h. Larger flow amounts can be determined by a bypass (partial flow) process.

It will be understood again that the designation "thermal" or "temperature related resistance" has reference to a material with a temperature coefficient of the electric conductivity.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for thermally measuring mass flow, comprising a hollow tube through which a gaseous, vaporous or liquid medium may be passed, temperature sensors disposed at the terminal areas of said tube, two concentric wire coils of a thermic resistance material wound around the outer periphery of said tube, a layer of predetermined thickness interposed between said coils and formed of a material of at most moderate heat conductivity, with at least part of the tube and wire coils surrounded by a cooling or heating device, whereby the mass flow may be measured by ascertaining the heat differential between said two wire coils and obtaining by means of these data and the data from the temperature sensors, the heat balance equation.

2. The apparatus of claim 1 wherein the wire coils and temperature sensors are electronically connected with a computer for solving the resulting heat balance equation.

3. The apparatus of claim 1 which includes an electric heating device disposed inside of said tube.

4. The apparatus of claim 3 wherein the electric heating device consists of one or more heating tubes or wires which are arranged on or within a support extending lengthwise of said tube.

5. The apparatus of claim 3 wherein the heating device is in the form of heating wires wound upon a support.

6. The apparatus of claim 1 wherein the terminal areas of the tube exterior of the cooling or heating device are enclosed by heat insulating covers.

* * * * *